United States Patent [19]

Pipon

[11] Patent Number: 4,634,181
[45] Date of Patent: Jan. 6, 1987

[54] ROUND HINGED-PART FOR LAND, SEA AND AIR VEHICLE SEATS

[75] Inventor: Yves Pipon, Flers, France

[73] Assignee: A & M Cousin & Cie, Flers, France

[21] Appl. No.: 718,430

[22] Filed: Apr. 1, 1985

[30] Foreign Application Priority Data

Apr. 18, 1984 [FR] France .................. 84 06131
Feb. 18, 1985 [FR] France .................. 85 02308

[51] Int. Cl.⁴ .................. A47C 1/024; B60N 1/06
[52] U.S. Cl. .................. 297/362; 16/347;
74/804; 297/365; 297/379
[58] Field of Search .......... 297/362, 364, 365, 379;
74/804, 805; 16/347

[56] References Cited

U.S. PATENT DOCUMENTS

| | | | |
|---|---|---|---|
| 4,020,717 | 5/1977 | Johnson | 74/804 |
| 4,382,630 | 5/1983 | Weston | 297/362 |
| 4,453,767 | 6/1984 | Walk et al. | 297/362 |
| 4,504,091 | 3/1985 | Ohshiro | 297/362 |

FOREIGN PATENT DOCUMENTS

| | | | |
|---|---|---|---|
| 2041302 | 2/1972 | Fed. Rep. of Germany | 297/362 |
| 3129672 | 10/1982 | Fed. Rep. of Germany | 297/362 |
| 2303502 | 10/1976 | France | 297/362 |
| 2467729 | 5/1981 | France | 297/362 |

Primary Examiner—Kenneth J. Dorner
Assistant Examiner—Peter R. Brown
Attorney, Agent, or Firm—Browdy and Neimark

[57] ABSTRACT

The round hinged-part comprises a fixed flange having a central opening receiving a main piece supporting a cam on which is mounted a double satellite with inner and outer tooth sets cooperating respectively with tooth sets of the fixed and movable flanges, a circular cut-off part of the fixed flange is used as a common centering path for the double satellite and for a central ovoid ring, and a ball-bearing is interposed between the movable flange and a ring mounted between the movable flange and the fixed flange.

16 Claims, 27 Drawing Figures

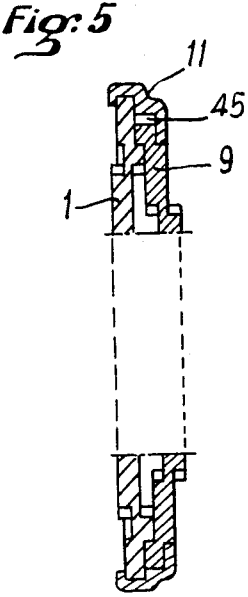
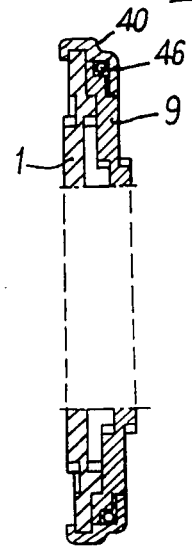
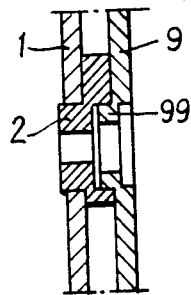
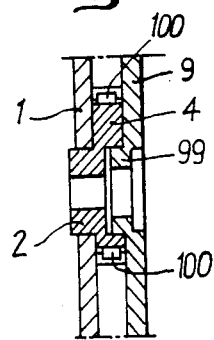
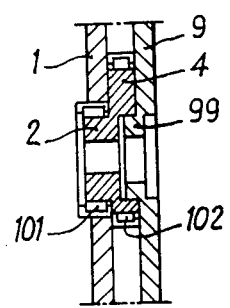
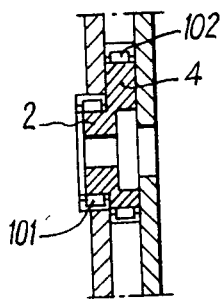
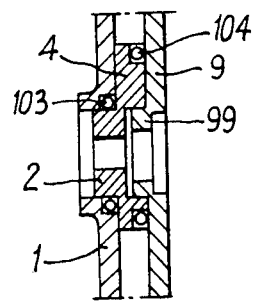
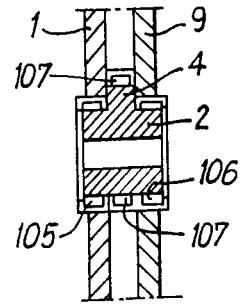

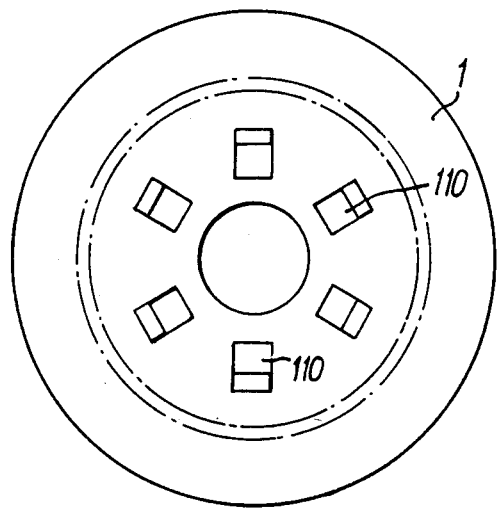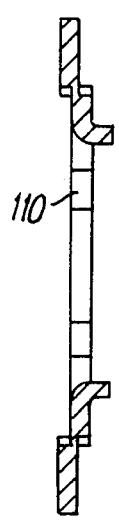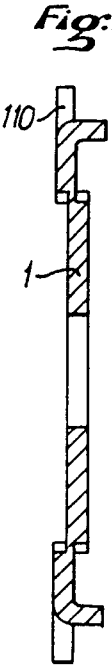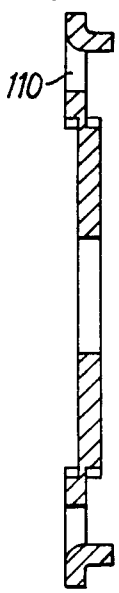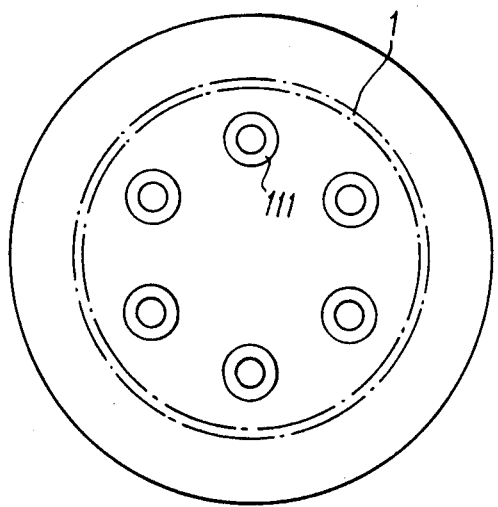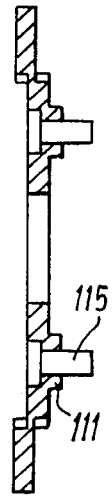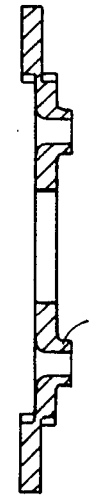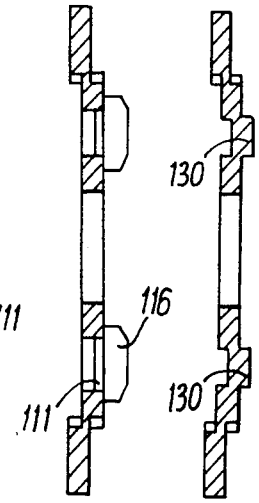

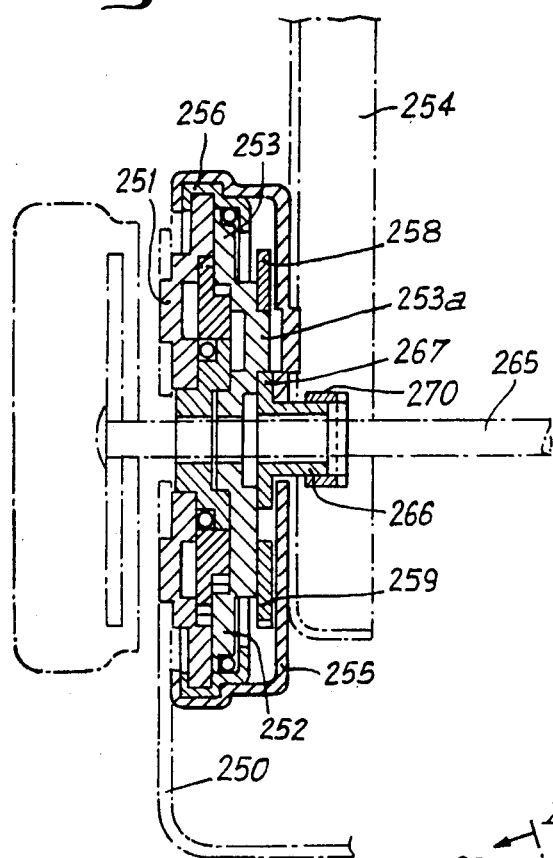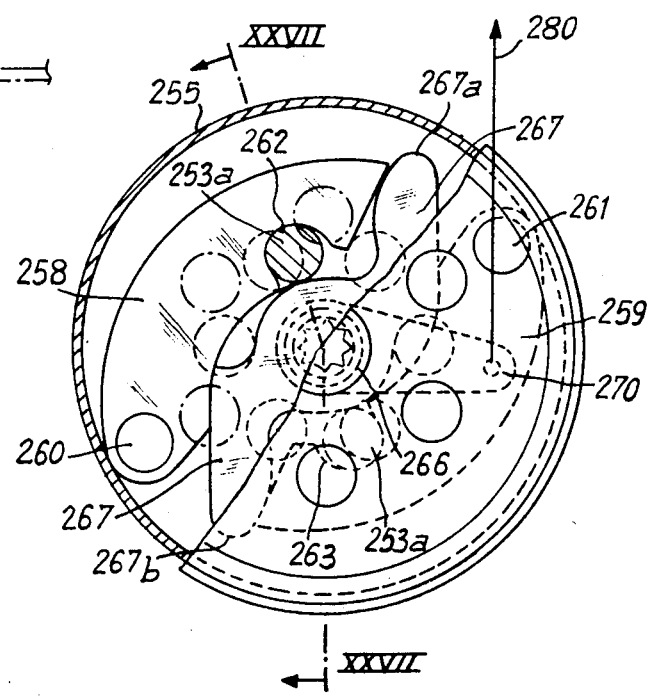

ROUND HINGED-PART FOR LAND, SEA AND AIR VEHICLE SEATS

FIELD OF THE INVENTION

Means for realizing continuous or discontinuous hinged-parts in order to permit by simple means an adjustment of the back of a seat relatively to the seating so as the user of the seat is seated in a position as comfortable as possible, have been known for a long time.

This problem is particularly important in case of land, sea or air vehicles, where the aim is to spare the tiredness of the persons driving the vehicle or transported by the vehicle.

The motor-car construction constitutes for the present invention the privileged field of application of these hinged-parts because the vehicles very often comprise at least one complete equipment, i.e. four hinged-parts, two for each back of the front-seats of the vehicle.

BACKGROUND OF THE INVENTION

In the latest years, and as a consequence of both the general structure of the vehicles and energy-sparing needs, a general tendency has been developed to create hinged-parts which are less and less voluminous, but also more and resistant because the seats must be also the place of fixations of the ends of safety-belts and, in case of a crash, the back frame must absorb by deforming a sufficient amount of energy so as to save to the passengers any violent absorption of energy and, as a consequence, to save them from being more or less injured.

The hinged-parts, which were known till now, had on the fixed side at least one hollow elongated piece enabling to maintain one of the flanges of the hinged-part onto the fixed part of the seat while the other movable hollow piece had an elongated piece which was rendered integral with the back frame and, after having included within this hollow volume, the parts which are necessary for a slow rotation of the movable flange relatively to the fixed flange, it was necessary to lock the whole unit, (1) by the central part through which the driving-shaft was guided and (2) also, on periphery of the hinged-part and generally at three or four points situated along the periphery of the hinged part. This conventional assembly permitted to obtain a certain resistance to the tearing-off of the movable flange relatively to the fixed flange when the back was practically vertical, but, as soon as the position of the back was much more inclinated, two of the support pieces of the periphery of the flanges were spaced apart from one another by an angle sometimes exceeding 180°, resulting in a reduction of the resistance to the tearing-off of the movable flange relatively to the fixed flange, particularly in case of lateral efforts.

The hinged-parts which are known by now also present the serious disadvantage, in order to find, as far as possible, a solution to this lack of resistance, to have their end parts treated, thus increasing the cost price and making still more difficult a junction of the treated part with the metal tubular frame or shaped sheet iron frame of the seating or the back by welding them, because this method of jointing treated parts with normal steels has never being proved to be very satisfactory.

New studies for realizing modern vehicles are obviously directed to the use of new materials (plastics materials, light alloys) in order to obtain coherent assemblies enabling by their lightness the use of engines of a small power and little consumption, but also of strong resistance to wear or in case of crash. The new studies involve studies concerning all future pieces and particularly the hinged-parts of the backs of seats. Therefore the aim of the present invention is to find a solution to all difficulties mentioned above by creating a hinged part which is compact, light and therefore pratically indestructible, and which comprises means facilitating a connection of the hinged-part with the frames of the seatings and backs, thus reducing the cost of the assemblies.

It is alternately possible, in a variant of the invention, to create a totally reversible hinged-part mechanism which can be easily blocked even by a manual control and therefore necessitating only one manufacture usable either through a motor-operated control or through a hand-operated control; thus having a much more advantageous cost.

SUMMARY OF THE INVENTION

According to the invention, the round hinged part comprises a fixed flange having a center with an opening receiving a main element supporting a cam on which a double satellite is mounted and is characterized in that the double satellite comprises an inner tooth set and an outer tooth set, one of said two tooth sets cooperating with an outer tooth set of the fixed flange and the other of said two tooth sets with an inner tooth set of the movable flange; that a circular cut-off part in the fixed flange serves as a centering path to both the double satellite and to a central ovoid ring; that a ball-bearing is interposed between the mobile flange and a ring mounted between the fixed flange and the movable flange; that ball-bearings are interposed between the circular cut-off part, the central ovoid ring and a needle ball race serving as resting piece to the double satellite relatively to the cam; that both the outer part of the fixed flange and the outer part of the movable flange comprise pieces enabling an easy engagement of the frame of the seating and the back of the seat onto the hinged-part mechanism; and that the main central piece comprises a center with a circular recess and a plain bearing provided to receive a driving piece of the hinged-part mechanism of the seat.

According to another feature of the present invention, the ovoid ring is placed between the fixed flange and the double satellite, with interposition of ball bearings between the movable flange and the outer periphery of the double satellite.

According to still another feature of the present invention, the movable flange is provided with a central opening comprising, on its outer periphery, a ball-bearing housed in a rim holding the outer periphery of the fixed flange which is also provided with a central opening constituting a gap with the opening of the movable flange which receives a satellite having two tooth sets with a first tooth set cooperating with the inner tooth set of the fixed flange and a second tooth set cooperating with the outer tooth set of the movable flange, this satellite bearing upon the eccentric rim and on the circular piece held by ball-bearings, the eccentric rim comprising two housings disposed at 120° from each other in order to contain rolling elements which are supported upon the inner side of the satellite when the central axis of the hinged-part is in a normal position since this central axis is provided with a tapered collar pulling back the rolling elements against the inner side of the satellite in order to block the latter.

Various other features of the invention will become apparent from the following detailed description.

BRIEF DESCRIPTION OF THE DRAWINGS

Embodiments of the invention are shown, as non limiting examples, in the accompanying drawings, wherein:

FIG. 5 is an alternative embodiment of the hinged-part provided with rollers;

FIG. 6 is also an alternative embodiment using outer balls;

FIGS. 7, 8, 9, 10, 11 and 12 are elevation views in cross-section of an embodiment of bearing-blocks which are plain bearings (FIG. 7); plain bearings with interposition needles between the cam and the satellite (FIG. 8); a single one plain bearing and needle ball races situated between the cam, the satellite and the fixed flange (FIG. 9); a small modification of the shape of FIG. 9 since the movable flange does not comprise any plain centering device (FIG. 10); the cam mounted on a plain bearing with balls interposed between the cam, the satellite and the fixed flange (FIG. 11); the cam supported on the fixed and movable flanges by needle ball races (FIG. 12) and the satellite;

FIGS. 13, 14, 15 and 16 describe the movable flange either in elevation front-view or in diametral cross-section, with openings of various shapes for connection of the movable flanges with the frame of the back and of the seating;

FIG. 17 is a front elevation view of a variant of the movable flange with diametral cross-sections shown in FIGS. 18, 19, 20 and 21 for the connection onto the movable flange of the connecting piece with the frame by means of rivets, screws, various straps or similar means;

FIG. 26 is an partly cross sectional elevation view of a disengaging piece provided with positioning latches used for seats of two-doors vehicles;

FIG. 27 is a view in cross-section according to line XXVII—XXVII of FIG. 26.

DESCRIPTION OF THE PREFERRED EMBODIMENT

Figure 1:
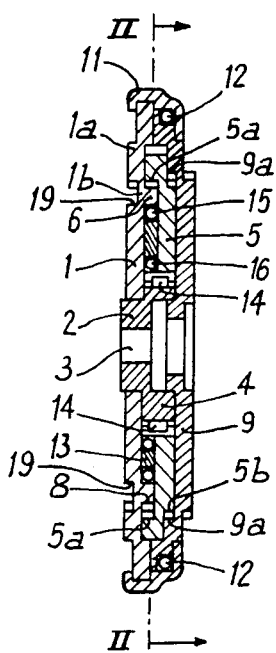
FIG. 1 is a diametral elevation view, in cross-section, of a first embodiment of the hinged-part.
Figure 2:
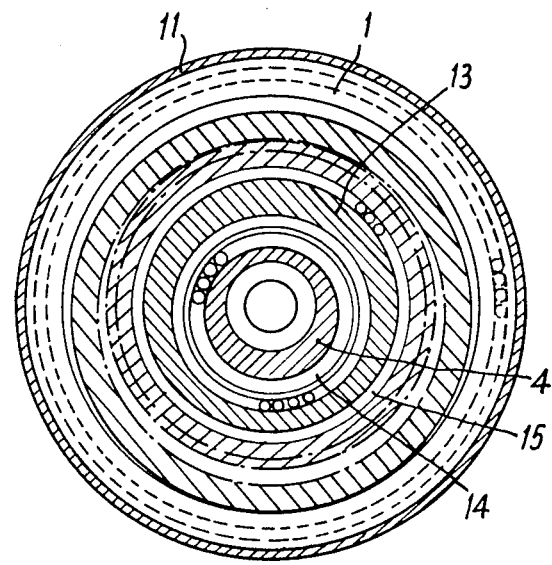
FIG. 2 is a cross-sectional view according to line II—II of FIG. 1.

Referring to FIGS. 1 and 2, it may be seen that the hinged-part is of a cylindrical configuration essentially composed of a fixed flange 1 centered on a main piece 2 constituting, on one hand, a bearing-block 3 of the driving shaft of the hinged-part and, on the other hand, a cam 4 for driving a double satellite 5 into motion. The fixed flange 1 is principally provided in its median region with two cuts-off parts 1a, 1b in order to constitute a circular boss 6 which serves as centering and reacting hub to the double satellite 5 which comprises an inner tooth set 5a cooperating with a tooth set 8 supported by the fixed flange 1. The other part of the double satellite 5 is provided with an outer tooth set 5b cooperating with an inner tooth set 9a of the movable flange 9. The inner tooth set 9a of the movable flange 9 is cut on a circulat recess of the movable flange 9 which comprises a second outer recess serving to the positioning on a rim 11 surrounding the circumferential outer part of the fixed flange 1 and the outer end cut-off part of the movable flange 9.

As shown in FIG. 1, balls 12 are placed between the rim 11 and the upper circumferential part of the movable flange 9, and an ovoid central ring 13 is placed between the circular boss 6 of the fixed flange 1 and a needle ball race 14 centered on the outer periphery of the cam 4 since ball-bearings 15, 16 are provided between the boss 6, the central ovoid ring 13 and the needle bearing 14.

As it will be understood, the opposed tooth sets on the double satellite 5 make already that the clearance existing between the teeth of the double satellite 5 and the teeth of the circular gear supported by the movable flange 9 and the fixed flange 1 is limited to a minimum, if not totally suppressed, since the male teeth of a piece systematically engage the female teeth of another piece in a diametrally opposed position. Moreover, positioning of the needle ball race 14, ball-bearings 15, 16 and ball-bearings 12 perfectly places the different pieces relatively to the others thus giving to the hinged part mechanism a perfect compactness and resistance. The rim 11 holding in a continuous and circular manner the pieces of the hinged-part between the movable flange 9 and fixed flange 1, considerably increases the resistance of the hinged-part mechanism, the flanges being connectable, as it will be seen hereafter, either directly or by supplementary pieces, with the frames of the seating and back of the seat in question.

Figure 3:
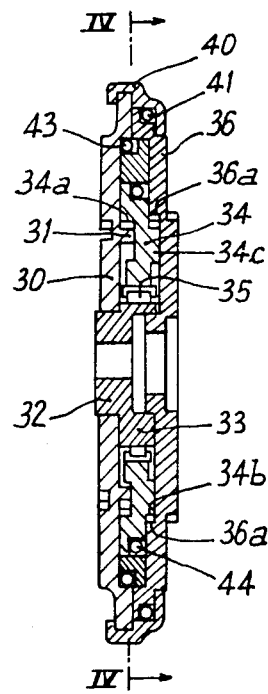
FIG. 3 is a longitudinal view in cross-section of a second embodiment of the hinged-part.
Figure 4:
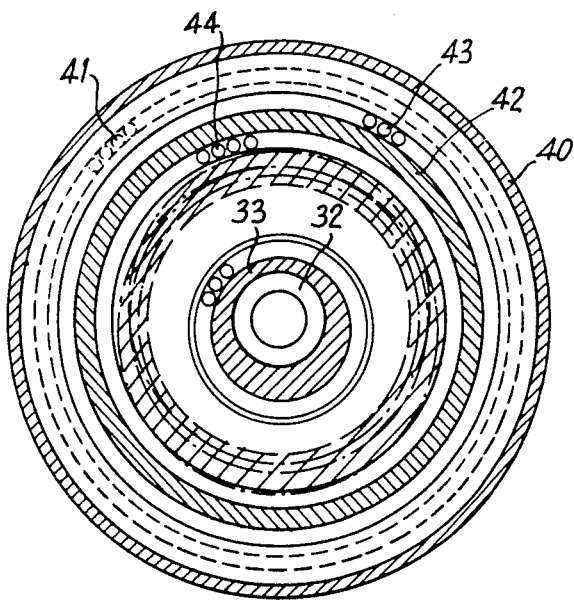
FIG. 4 is a view in cross-section according to line IV—IV of FIG. 3.

FIG. 3 shows the fixed flange 30, which comprises a circular tooth 31 provided with an outer tooth set and is centered on the main piece 32 which supports the cam 33. The double satellite 34 is mounted onto the cam 33 by means of a needle ball race 35. Due to the fact that the tooth set of the circular tooth 31 is outwardly directed, the cooperating tooth set 34a of the double satellite 34 is inwardly directed. The second tooth set 34b of the double satellite 34 is supported by a circular tooth 34c and is outwardly directed. Finally the movable flange 36 comprises a circular cut-off part 36a on which is cut a tooth set, which is inwardly directed and cooperates with the tooth set 34b of the double satellite 34. It is noted that the movable flange 36 is connected to the fixed flange 30 by a continuous circular rim 40 as in FIGS. 1 and 2 with interposition, between the movable flange 36 and the rim 40, of a ball-bearing 41.

A slightly ovoid ring is interposed between the movable flange 36, the outer periphery of the double satellite 34, with positioning ball-bearings 43, 44. As in the preceding case, the volume delimited by the movable and fixed flanges is totally filled by the cam 33, the double satellite 34, the ovoid ring 42 and the various ball-and needle-bearings 41, 43, 44 and 45. Moreover, the reversal of the tooth sets with a diametrally opposed contact, as mentioned above, allows to obtain a hinged-part mechanism which is homogeneous and pratically without any clearance between the tooth sets. The result is a hinged-part mechanism which is totally reversible since it is provided with the ball-and needle-bearings described above, but this mechanism can become an irreversible hinged-part mechanism in case of suppression of the ballor needle-bearings and when the various elements constituting the mechanism are supported on plain-bearings.

This permits to have irreversible hand-operated mechanisms, or on the contrary totally reversible mechanisms, the latter being thus able to be actuated from an electrical motor-set or similar, with if it is required a manual blocking provided on one part of the mechanism of the hinged-part for example between the fixed flange 1 and the main piece 2, or between the fixed flange 30 and the main piece 32.

Referring to FIG. 5, it may be seen that the ball-bearings can very easily be replaced by needle or roller bearings 45 situated between the movable flange 9 and the rim 11.

FIG. 6 describes the same assembly but shows particularly an outer ball-bearing 46.

FIG. 7 describes the main piece 2 mounted in order to use plain bearings and thus to create an irreversible mechanism since the main piece 2 is supported on a cut-off piece 99 provided on the movable flange 9.

FIG. 8 describes a same assembly that of FIG. 7 but the cam 4 supports a needle-bearing 100.

In that case, the mechanism is irreversible.

FIG. 9 describes an assembling of the pieces exclusively effected on roller-bearings 101, 102 as shown in FIG. 10, but here the cut-off part 99 is suppressed.

FIG. 11 describes a positioning of the ball-bearings 103, 104 between the fixed flange 1, the main piece 2 and the cam 4 supporting the satellite 5 not represented.

FIG. 12 describes the main piece 2 which is doubled and supports in its center the cam 4. The main piece is received in the ball-bearings 105, 106, and the double satellite on a roller-bearing 107.

FIG. 13 is a front view of the outer fixed flange 1 which is provided in its central region with openings 110 which can be of various configurations as shown in FIGS. 14, 15 and 16. These openings are used for an easy connection of the mechanism with the frames of the back of the seat.

FIG. 17 describes the fixed flange 1 provided with openings 111 through which rivets 115, clamps 116 or other pieces can be placed as shown in FIGS. 18, 19 and 20 or, as shown in FIG. 21, circular cut-offs 130 in order to secure a quick, easy and not expensive connection of the pieces forming the frame of the back onto the hinged-part mechanism, it being understood that the same system is adapted (FIGS. 13 to 21) for the fixed flange in order to hold the latter on the frame of the seating.

Figure 23:
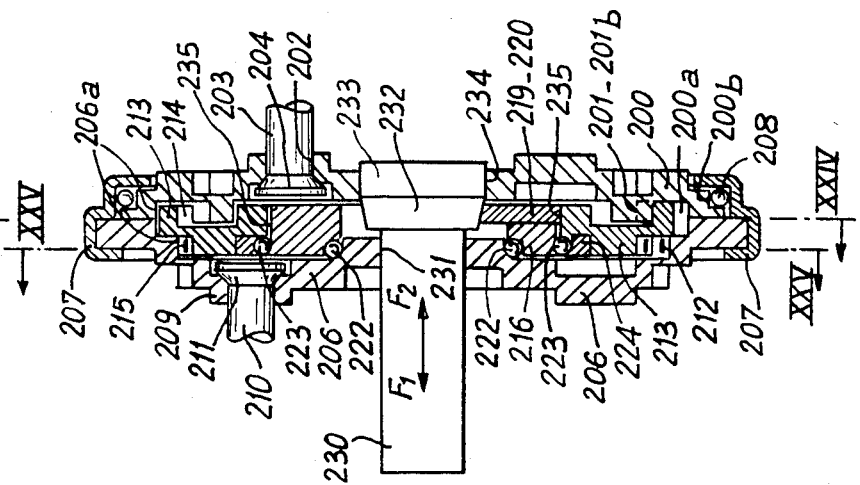
FIG. 23 is a diametral view in cross-section according to line XXIII—XXIII of FIG. 22.
Figure 22:
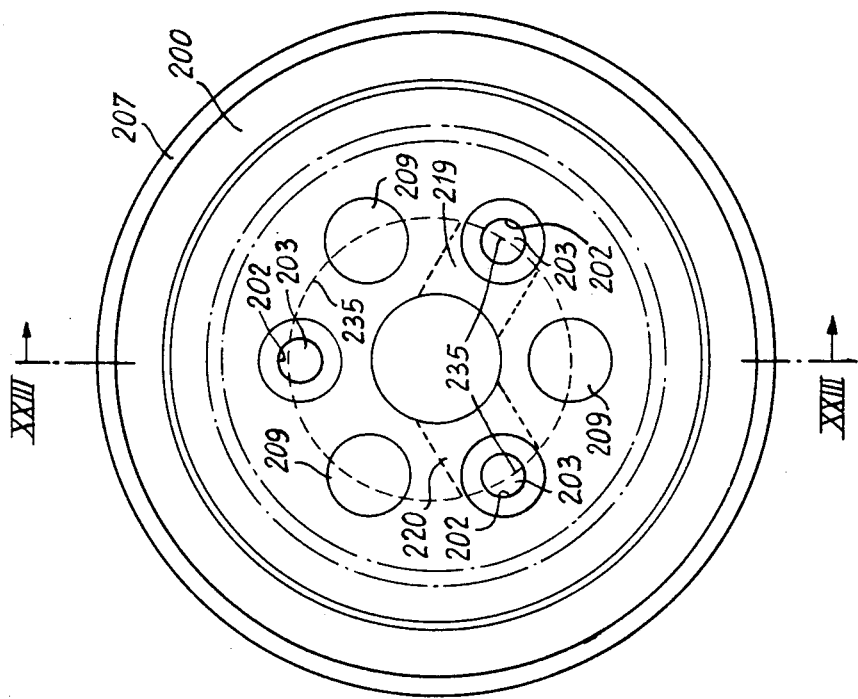
FIG. 22 is a front-view of an alternative embodiment of the hinged-part mechanism.

As illustrated in FIGS. 22 and 23 the hinged-part mechanism comprises a movable flange 200 provided on its inner side into a circular opening 200a with a tooth set 201 and, placed at 120°, three holes 202 in which rods 203, with heads 204 for the fixation of the movable flange 200 onto the frame of the back of a seat, are housed.

A fixed flange 206 is in contact with the movable flange 200, and the two pieces are connected by means of a rim 207 which can be crimped.

A ball-bearing 208 is interposed between the periphery 200b of the movable flange 200 and the rim 207 for an easy rotation of the movable flange 200 relative to the fixed flange 206.

As it is shown in FIG. 23, the fixed flange 206 comprises, placed at 120° apart from each other, bosses 209, which comprise rods 210 with heads 211 permitting the fixation of the fixed flange 206 onto the frame of the seating.

The fixed flange 206 is provided in a central opening 206a with an inner tooth set 212.

It should be noticed that the tooth set 201 of of the movable flange 200 is placed on the lower part of the opening 200a while the inner tooth set 212 of the fixed flange 206 is placed on the outer part of the opening 206a.

The opening 200a of the movable flange 200 and the opening 206a of the fixed flange 206 enable, as shown in FIG. 23, a positioning of a satellite 213 comprising a tooth set 214 facing the tooth set 201 of the movable flange 200, and another tooth set 215 facing the tooth set 212 of the fixed flange 206. Between the movable flange 200 and fixed flange 206 is placed an eccentric rim 216 which is provided, on its front side facing the movable flange 200, with housings 217, 218 placed at 120° from each other and containing rolling elements 219, 220. So as to hold the rim 216 in its eccentric position, a central ball-bearing 222 and a second ball-bearing 223 are provided, the ball-bearing 223 being supported at its outer periphery by a circular piece 224 housed below the outer part of the satellite 213. The central ball-bearing 222 is itself supported by the central inner side of the fixed flange 206 in the opening 206a.

Finally and as described to the drawings, a spindle 230 passes through the hole 231 pierced in the center of the fixed flange 206, which spindle 230 is continued in a collar 232 integral with the spindle 230 and having a tapered cross-section. The collar 232 is continued by a cylindrical head 233 which engages into a central hole 234 pierced in the movable flange 200.

Normally, the spindle 230 is held in the position shown in FIG. 23 by means of a spring which serves to draw the spindle 230 into the direction indicated by the arrow $F_1$ (FIG. 23). This spring can be fixed, by example, between a fixed point which is integral with the frame of the seating of the seat and any point taken of the spindle 230.

Figure 24:
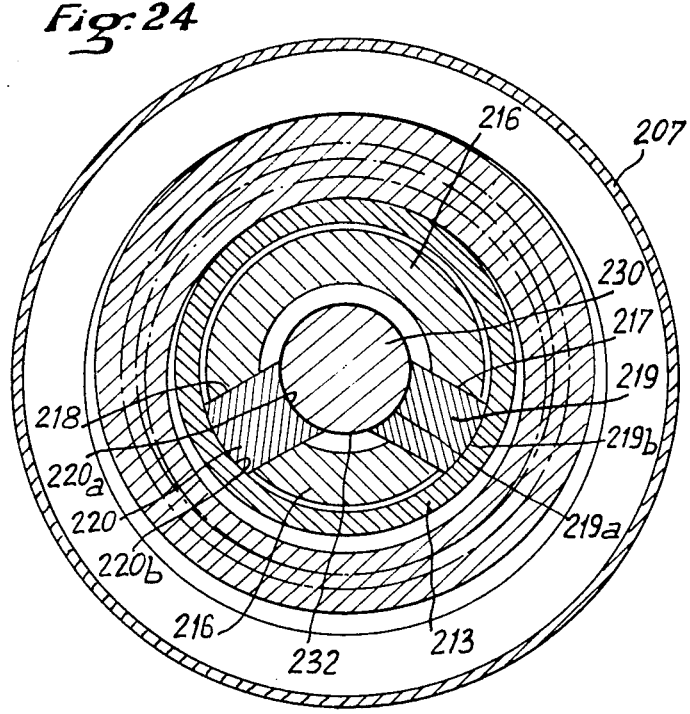
FIG. 24 is a view in cross-section according to line XXIV—XXIV of FIG. 23.
Figure 25:
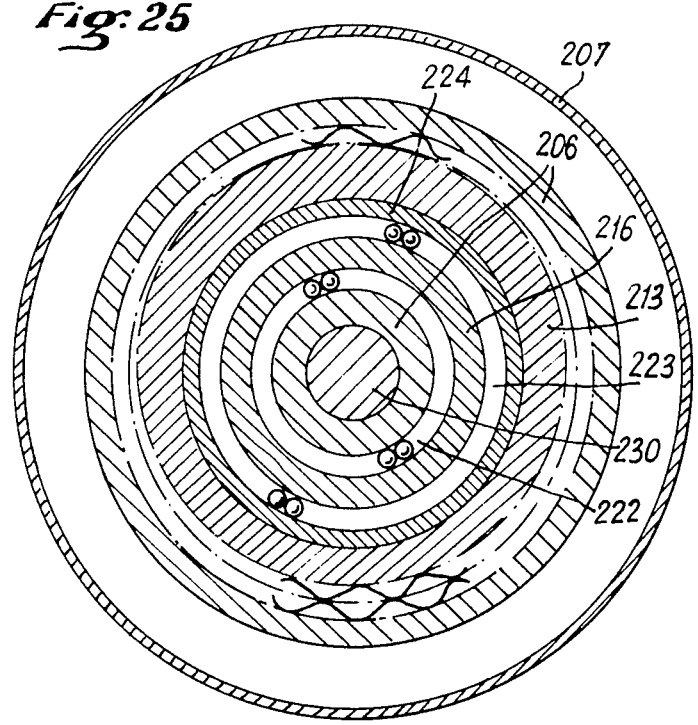
FIG. 25 is a view in cross-section according to line XXV—XXV of FIG. 23.

When the pieces are in the position shown in FIGS. 23, 24, 25, the rolling elements 219, 220 being supported by their lower edges 219a, 220a upon the tapered part constituted by the collar 232, hold securely the central hollowed area of the satellite 213 by preventing it from turning; thus causing due to the tooth sets 201, 214, 215 and 212 a blocking of the three parts: movable flange 200, satellite 213 and fixed flange 206.

In the case of drawing back the spindle 230 in the direction indicated by the arrow $F_2$ (FIG. 23), the collar 232 is freed, the rolling elements 219, 220 are free, and from there on, it is easy, owing to the presence of the ball-bearings 208, 222, 223 to make the movable flange 200 turn to the rim 207 relatively to the fixed flange 206 and thus to obtain an angular displacement of the back relatively to the seating of the seat in question.

The hinged-part being reversible, a slight pressure is only required on the back of the seat to adjust in the rearward inclination and, in case of a desired setting upright of the back, the conventional return spring acts in opposite direction by bringing back the seat back against the user's back. As soon as the effort exerted in the direction indicated by the arrow $F_2$ has ceased, the return spring brings the spindle 230 back in the direction of the arrow $F_1$, and the hinged-part is immediately blocked by means of the rolling elements 219, 220.

There has thus been described a very simple part which permits an adjustment of position of the back of a seat from its practically vertical position to its horizontal position, without any restriction since the back of the seat can be blocked at any moment exactly in the position desired by the user.

It is thus necessary to obtain a continuous articulation enabling an extremely precise angular adjustment of the hinged part, which adjustment is commonly called in the art "0° adjustment".

This is obtained by the thrust of the rolling elements 219, 220 caused by the tapered collar 232 of the driving spindle 230, which act on the smooth inner part 235 of the satellite and thus block the mechanism. Moreover, the thrust causes a reaction on the smooth parts 231, 233 of the spindle 230 with the corresponding bores realized on the movable flange 200 and fixed flange 206; on the other hand, a reaction is also obtained by the thrust of the rolling elements 219, 220, this reaction being provided on the tooth set opposite to the maximal eccentration of the eccentric rim 216. In the case of use of a positioning tooth set made on the blocking side of the rolling elements 219, 220 the inner part 235 of the satellite 213 comprises also a series of teeth corresponding to those of the rolling elements on the periphery of the bore.

As mentioned above, a slight force is sufficient to make the satellite to rotate and thus, a very small pressure to brake it, the braking resulting from the rolling elements 219, 220.

Moreover, the hinged-part comprises a satellite 213 of a simple construction provided with a same inner and outer tooth set 214, 215. Generally, the satellite 213 is obtained by a semi-cut-off step, giving a high-resistance part.

Though the outer side 219b, 220b of the rolling elements 219, 220 is represented as being smooth, the outer face can be also toothed, the inner periphery of the satellite 213 being then also toothed.

Each seat is normally provided with two hinged-parts similar to the hinged-parts as described above, one placed on the right of the seat and the other on the left. In this case, the slide driving of the spindles 230 can be operated either manually by means of a central control placed under the seat, or by means of an electric device such as an electro magnet also placed under the seat. In the case where there is only one hinged-part per seat, the other side of the seat is provided with a simple locking arrangement which is disengageable when it is actuated and allows the adjustment of the back relatively to the seating of the seat in question.

It is well-known that, in the two door vehicles, it is absolutely necessary to pull the back down onto the seating in order to allow the back-seat passengers to enter or to go out of the vehicle. But, the already described hinged-parts cannot allow such a pulling down of the back onto the seating since the user would be obliged to disadjust completely the back of the seat which would take too much time, especially in case of an accident, when a quick leaving of the back-seat passenger(s) is required.

FIGS. 26 and 27 give a solution for these hinged-parts according to which, if the fixed flange 251 is always fastened, as described above, onto the frame 250 of the seating, the hinged-part, indicated by numeral 252, which can be of any type possible but is circular, has a movable flange 253 which is fixed on the frame 254 of the back of the seat by means of a cut 255 rotatively mounted on the rim 256 which corresponds to the rim 40 or the rim 207.

The connection of the movable flange 253 with the rim 256 is provided by means of two locks 258, 259 articulated on spindles 260, 261 which are fixed with the rim 256. The locks 258, 259 comprise diametrally opposed cavities 262, 263 which normally are supported on overthicknesses 253a of the movable flange 253. Therefore, a rigid connection is provided between the movable flange 253 and the cup 255, and thus the frame 254 of the seat which is rendered fixed with the cup 255 by suitable means (bolts and nuts, rivets or welding).

Moreover, the central shaft 265, around which will pivot the various pieces of the hinged part, comprises a sleeve 266 mounted loose on the shaft 265 and fixed with a cam 267 whose ends 267a, 267b enable, when the sleeve 266 rotates under the action of a lever 270 fixed on the sleeve 266, to disengage the overthicknesses 253a from the cavities 262, 263 provided in the locks 258, 259, whereby allowing the free rotation of the cup 255 and inevitably the lowering of the back of the seat onto the seating since the cup 255 is fixed with the frame 254 of the back of the seat.

It will be understood that the lever 270 is controlled by a drive 280 which can be manual, or still actuated by a motor supplied, for example on opening of a door, since an urgent locking of the drive 280 can be operated when the doors are closed.

The assembly is obviously mounted on each side of a seat in order to provide a good stability of the back of the seat.

I claim:
1. Hinge apparatus for seats used in land, sea and air-vehicles, comprising:
 a housing constituting first and second circular flanges, and means for coupling said first and second flanges together for relative rotation,
 said first flange (1) adapted to be fixed to a first portion of a seat and having in its center an opening receiving a main piece (2) supporting a cam on which a double satellite gear is mounted,
 said second flange being adapted to be secured to a second portion of the seat,
 the double satellite gear including an inner tooth set (5a) and an outer tooth set (5b), one of said two tooth sets cooperating with an outer tooth set (8a) of the first flange (1) and the other of said two tooth sets cooperating with an inner tooth set (9a) of the second flange (9),
 said first flange further having annular means facing said second flange for centering said double satellite gear (5) and a central ovoid ring (13) between said first and second flanges,
 first bearing means (12) interposed between the second flange (9) and a rim for securing the second flange (9) to the first flange (1),
 second bearing means (15, 16) interposed between the annular centering means (1b), the central ovoid ring (13) and a needle ball race (14) serving as a resting piece for the double satellite gear (5) relative to the cam (4),
 opposing faces of the first flange (1) and the second flange (9) including means, communicating with the interior of said housing, for securing said hinge apparatus to the first and second portions of the seat, the central main piece (2) having a central portion with a circular recess and a plain bearing for receiving means for driving the mechanism of the hinge apparatus.

2. The hinge apparatus according to claim 1, wherein the ovoid ring is placed between the second flange (36) and the double satellite gear (34) with interposition of ball-bearing (43,44) between the first flange (30) and the outer periphery of the double satellite gear (34).

3. The hinge apparatus according to claim 1, wherein the main piece (2) supporting the cam (4) is mounted on plain bearing when the operation of the hinge apparatus is irreversible.

4. The hinge apparatus according to claim 1, wherein said second flange (200) is provided with a central opening (200a) having on its outer periphery a ball-bearing (208) housed in a rim (207) holding the outer periphery of the first flange (206), the latter being provided with a central opening (206a) defining a gap with an opening (202a) of the second flange (200) in which a satellite gearing (213) is housed, said satellite gearing having a first tooth set (214,215) cooperating with the outer tooth set (201b) of the second flange (200) and a second tooth set cooperating with the inner tooth set (212) of the first flange (206), said satellite gearing bearing upon an eccentric rim (216) and a circular piece (224) held by ball-bearings (222,223), the eccentric rim (216) comprising two housings (217,218) placed at 120° from one another in order to contain rolling elements (219,220) which are supported on the inner side of the satellite gearing (213) when a central spindle of a hinged part (230) is in a normal position due to the fact that said spindle has a tapered collar (232) pushing the rolling elements (219,220) back against the inner side of the satellite gearing (213) in order to block the satellite gearing (213).

5. The hinge apparatus according to claim 4, wherein the spindle (230) supporting the tapered collar (232) is biased by a spring to return said spindle to a rest position where the collar pushes the rolling elements (219,220) back against the lower periphery of said satellite gearing (213) while, when the spindle (230) is pushed back against the action of said spring, the rolling elements (219,220) are freed and rotation of said satellite gearing (213) is permitted in order to adjust an inclination of the first seat portion relative to the second seat portion.

6. The hinge apparatus according to claim 4, wherein the outer periphery (219b,220b) of the rolling elements (219,220) is smooth.

7. The hinge apparatus according to claim 4, wherein the outer periphery (219b,220b) of the rolling elements (210,220) is toothed.

8. The hinge apparatus according to claim 4, wherein blocking of the mechanism is obtained by reactions of friction created by a thrust of the rolling elements (219,220) exerted on the inner periphery of the satellite gearing (213) and by pressures exerted on bores of the first (206) and second (206) flanges, and on the tooth set which is placed opposite to the maximal eccentricity of the eccentric rim (216).

9. The hinge apparatus of claim 8, wherein said inner periphery of said satellite gearing is smooth.

10. The hinge apparatus of claim 8, wherein said inner periphery of said satellite gearing is toothed.

11. The hinge apparatus according to claim 4, and further comprising a cup (255) freely surrounding the outer periphery of the mechanism of the hinged part and having an outer side supporting the frame of one of the first and second seat portions, said cup having an inner side carrying a pair of spindles (260,261), each of said spindles defining a pivot supporting locking means for articulation of said locking means (258,259) about a respective one of said spindles, each one of said locking means being provided with cavities (262,263) which engage on projections (253a) of the second flange (253) of the hinged part, said locking means being disengageable by means of a double-sided cam (267) fixed with a sleeve (266) mounted loosely on the central shaft of the mechanism of the hinged-part, the motion of the double-sided cam being provided by means of a lever (270) fixed with the double-sided cam (267).

12. The hinge apparatus of claim 11, wherein movement of said lever, and thus of said double-sided cam, is imparted by hand.

13. The hinge apparatus of claim 11, wherein movement of said lever, and thus of said double-sided cam, is imparted by motor means.

14. A hinge assembly for pivotably connecting a seat back of a vehicle seat with the frame of the vehicle seat, comprising:
two circular hinge parts rotatable relative to one another about a pivot axis between a plurality of relative positions;
means for coupling the peripheries of said hinge parts to form a housing; and
means for selectively adjusting the relative position between said hinge parts, said adjusting means including
first eccentric means having an aperture centered on said pivot axis, said eccentric means being carried by one of said two hinge parts for rotation therewith,
first gear means carried by one of said hinge parts,
second gear means carried by the other of said hinge parts,
third gear means, supported between said hinge parts, having gearing means for interengaging said one hinge part with said other hinge part
locking means carried within said housing and engagable with one of said hinge parts for preventing movement of said one hinge part, and
operator means supported by, and including a portion disposed within, said housing, said operator means comprising means for selectively moving said locking means into and out of engagement with said one hinge part,
whereby said locking means may be selectively moved into engagement with said one hinge part to lock said hinge parts in one of said plurality of relative positions.

15. The hinge assembly of claim 14, wherein
said locking means comprise spaced, radially extensive arms engagable with said third gear means, and
said operator means comprises a camming surface for urging said arms away from said pivot axis into engagement with said third gear means.

16. The hinge assembly of claim 14, wherein
one of said hinge parts include projections extending axially away from said housing;
said locking means comprises
a member having a portion overlying said one hinge part, said portion pivotably supporting surfaces for engagement with said projections, and
a cam element, having radially opposed arm-engaging surfaces, for rotation about said pivot axis; and
said operator means comprises means for driving said cam element in rotation about said pivot axis.

* * * * *